United States Patent
Fujii et al.

(10) Patent No.: US 6,500,513 B2
(45) Date of Patent: Dec. 31, 2002

(54) ADHESIVE COMPOSITION AND OPTICAL DISK USING THE COMPOSITION

(75) Inventors: Sana Fujii, Machida (JP); Sumita B. Mitra, West St. Paul, MN (US); Katsuya Takamori, Hachiouji (JP); Kazuta Saito, Machida (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/725,355

(22) Filed: Nov. 29, 2000

(65) Prior Publication Data

US 2002/0099138 A1 Jul. 25, 2002

(51) Int. Cl.$^7$ .......................... G11B 7/24; B32B 15/08; B32B 27/06; C09J 175/16
(52) U.S. Cl. .................. 428/65.1; 428/65.2; 430/270.1; 430/270.11; 156/333.1; 525/454; 525/455; 525/920; 528/50; 528/52; 528/75; 528/76
(58) Field of Search ................ 428/65.1, 65.2; 430/270.1, 270.11; 525/454, 455, 920; 528/75, 50; 156/333.1

(56) References Cited

U.S. PATENT DOCUMENTS 5,328,947 A * 7/1994 Tagucki .................... 524/850
6,116,774 A * 9/2000 Sasaki ...................... 525/455

FOREIGN PATENT DOCUMENTS

| JP | 4-43332 | 7/1992 |
| JP | 7-37274 | 2/1995 |
| JP | 09-037274 | * 2/1995 |
| JP | 10-130602 | 5/1998 |
| JP | 11-120630 | 4/1999 |
| JP | 11-126379 | 5/1999 |
| WO | WO 00/75253 | 12/2000 |

* cited by examiner

Primary Examiner—Patricia A. Short
(74) Attorney, Agent, or Firm—Scott A. Bardell; Daniel R. Pastirik

(57) ABSTRACT

The invention provides a two-part adhesive composition making it possible to mutually bond disk substrates within a relatively short time and to produce an optical disk, and an optical disk having a metal film, corrosion of which is restricted under a high-temperature high-humidity condition, and which is produced by using the two-part adhesive composition. A two-part adhesive composition of the invention comprises first and second parts each containing urethane acrylate having a polytetramethylene glycol skeleton and an acrylate having a hydroxyl group in its molecule, wherein the first part further contains a diacyl peroxide and the second part further contains a tertiary amine. Organic peroxide is preferably diacyl peroxide and a setting promoter is preferably a tertiary amine. Either one, or both, of the first and second parts may further contain a photo-polymerization initiator.

15 Claims, 2 Drawing Sheets

ADHESIVE COMPOSITION AND OPTICAL DISK USING THE COMPOSITION

FIELD OF THE INVENTION

This invention relates to an adhesive composition for an optical disk. More particularly, this invention relates to an adhesive composition that will be useful for producing an optical disk that is used as an optical recording medium having a structure in which transparent substrates are bonded to each other and which is provided with at least one reflecting metal film, and to an optical disk using the adhesive composition.

BACKGROUND OF THE INVENTION

Optical disks known as a high-density recording medium such as DVD have been used vigorously as a recording medium in versatile fields for recording music and images, and for computer-associated recording. In such optical disks, digital signals recorded on the disk are detected as the changes of reflection intensity of a semiconductor laser beam emitted from an optical read head so as to read recorded data. These disks include read-only disks, disks capable of writing but not capable of erasing, and disks capable of both writing and erasing.

When two substrates are bonded to each other by bonding, bonding by using a photocuring type adhesive is effective for a one-side type disk (in which recorded data is read only from one side) because rays of light transmit from the side of a transparent substrate (a dummy substrate), and this bonding method has been mainly employed for a practical production of DVD. In a double-side type (in which recorded data are read from both sides), on the other hand, the photocuring type adhesive cannot be used because opaque substrates are bonded to each other. Thermosetting adhesives (an epoxy type, a melamine type, a urethane type, an acrylic type, etc.) and hot-melt adhesives have been used in the past in order to bond such opaque substrates to each other.

However, the bonding method using the thermosetting adhesive or a hot-melt adhesive requires heating, and involves the problem of warp and deformation of the substrates. The disk bonded by the hot-melt adhesive has the problem of low thermal stability. Therefore, a delay curing photo-cationic setting type epoxy adhesive has been widely used to bond opaque substrates to each other.

When the delay curing photo-cationic setting type epoxy adhesive is used, the adhesive is first applied to the substrates before bonding, and the rays of light are irradiated to start the reaction. The substrates are bonded during this reaction and are left standing until the adhesive is completely set. This method involves the problem that adjustment of the reaction time is difficult. If the reaction time is designed excessively short, the reaction proceeds excessively before bonding so that bonding is likely to be insufficient. When the reaction time is excessively long, on the other hand, the time for keeping the substrates fixed gets elongated so as to prevent deviation and deformation of the substrates until adhesion is completed after bonding of the substrates. Productivity is remarkably deteriorated in this case. In the adhesive of this type, the catalyst creates an acid during the reaction. Though this acid is necessary for the reaction, the acid corrodes the recording film. Fillers for entrapping the acid are therefore added to prevent the corrosion. In consequence, the adhesive becomes likely to separate and to become opaque, and appearance of the inner peripheral transparent portion of the disk after bonding (a region not having signal recording) is deteriorated. This adhesive is applied by a screen-printing system. At this time, fine bubbles are entrapped in the applied adhesive and remain after bonding, too. Though this problem is not much severe in the past, it is believed to become critical when the recording capacity of the optical disk increases in future.

An attempt has been made also to use a two-part adhesive for bonding transparent substrates for DVD. Japanese Unexamined Patent Publication (Kokai) No. 7-37274 mixes a two-part adhesive by using a mixing applicator and then applies the mixture. In this case, since the setting reaction starts occurring immediately after mixing, the time from the application to bonding is limited. If a blend design that retards the setting reaction is employed, the problem of productivity occurs in the same way as in the case of the photo-cationic setting type epoxy adhesive. The adhesive used in this Japanese Unexamined Patent Publication (Kokai) No. 7-37274 uses an acrylic acid ester monomer having a hydroxyl group in its molecule. However, this reference does not disclose an adhesive that uses this adhesive in combination with urethane acrylate having polytetramethylene glycol as a skeleton.

Japanese Examined Patent Publication (Kokoku) No. 4-43332 discloses a production method of an optical disk using a two-part type acrylic adhesive, wherein a first part is applied to one of disk substrates and a second part, to the other substrate, for bonding them together. However, the adhesive used is known (commercially available) and is not developed specifically in consideration of durability of optical disks. Japanese Unexamined Patent Publication (Kokai) Nos. 11-120630 and 11-126379 describe the use of two-part type adhesives, but these adhesives are not specifically developed for optical disks, either.

Utilization of optical disks such as DVD as high-density recording media has been expanded, but no adhesive has yet been obtained that facilitates the production of double-side type read system disks that are more suitable for high-density recording, by mutually bonding substrates each provided with a signal recording layer.

It is, therefore, an object of the present invention to provide a novel adhesive composition that makes it easier to mutually bond substrates each having a signal recording layer without deteriorating characteristics of a disk produced, such as durability.

SUMMARY OF THE INVENTION

According to one aspect of the present invention, there is provided a two-part adhesive composition comprising first and second parts each containing urethane acrylate having a polytetramethylene glycol skeleton and an acrylate having a hydroxyl group in its molecule, wherein the first part further contains diacyl peroxide and the second part further contains a tertiary amine.

Either one, or both, of the first and second parts may further contain a photo-polymerization initiator.

According to another aspect of the present invention, there is provided an optical disk including disk substrates bonded to each other and at least one reflecting metal film, wherein the disk substrates are bonded by using a two-part adhesive composition according to the present invention.

Urethane acrylate described above is preferably an oligomer comprising at least portions originating from tetramethylxylene diisocyanate, hydroxyethyl acrylate and ethylene glycol, respectively, besides the skeletal portion of polytetramethylene glycol.

The acrylate having a hydroxyl group in its molecule described above is preferably at least one kind of the members selected from the group consisting of hydroxyethyl acrylate, 2-hydroxypropyl acrylate, 4-hydroxybutyl acrylate and 2-hydroxy-3-phenoxypropyl acrylate, and more preferred are the former three members.

DETAILED DESCRIPTION OF THE PREFERRED EMBODIMENT

Figure 1:
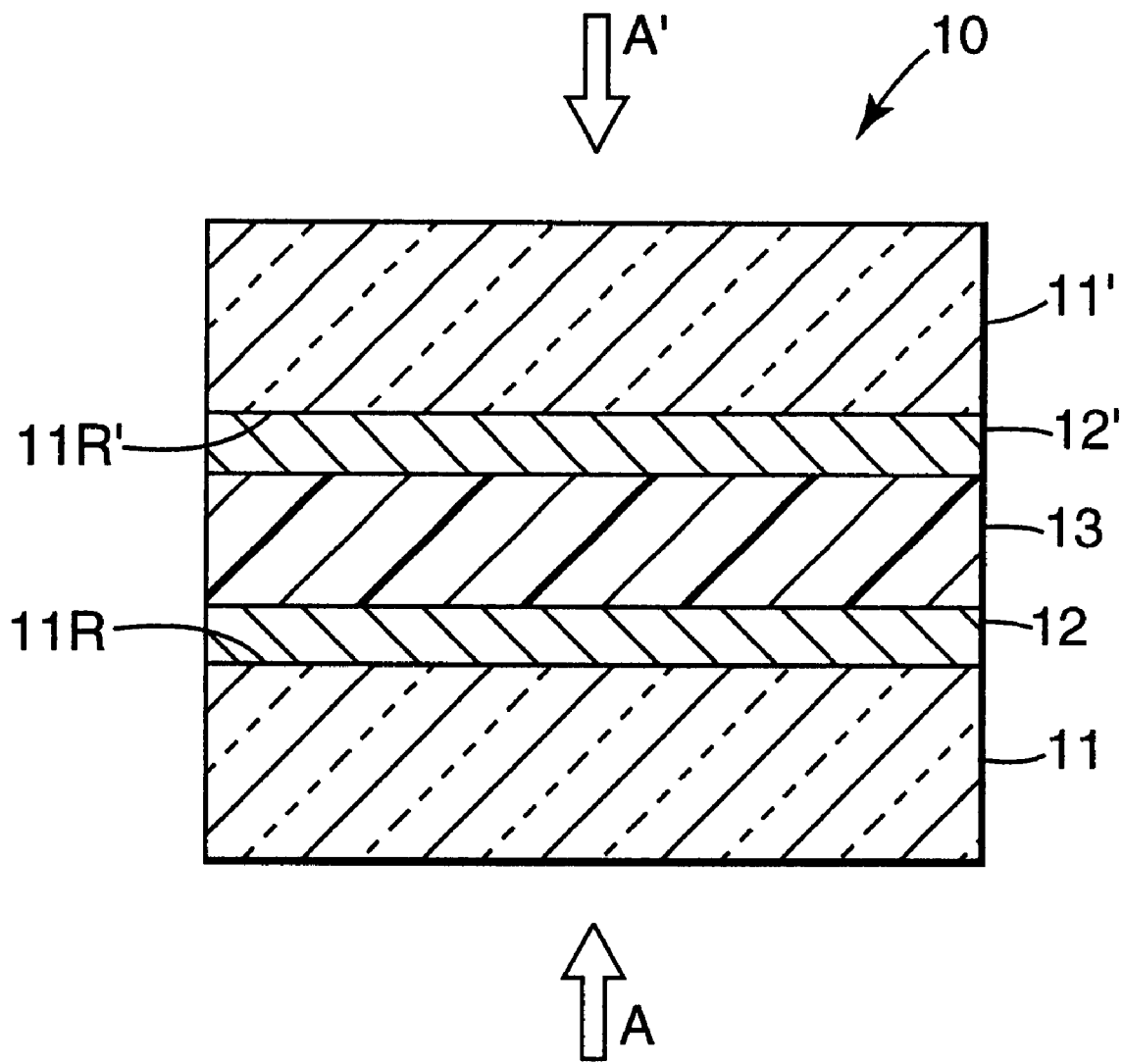
FIG. 1 is an explanatory view useful for explaining an optical disk according to one embodiment of the present invention.

A main component (base resin) in the two-part adhesive composition according to the present invention is urethane acrylate having a polytetramethylene glycol. Urethane acrylate that can be suitably used in the present invention is an oligomer prepared from at least tetramethylxylene diisocyanate, hydroxyethyl acrylate and ethylene glycol components besides polytetramethylene glycol as the skeleton-constituting component. A suitable example of such an oligomer is an oligomer containing polytetramethylene glycol, tetramethylxylene diisocyanate, hydroxyethyl acrylate and ethylene glycol at a blend molar ratio of about 62:15:14:9, and having a weight average molecular weight of about 4,000 to about 7,000. Such a urethane acrylate oligomer is commercially available from the Nippon Synthetic Chemical Industry Co., Ltd., under a trade name "'UV-6100B". This urethane acrylate oligomer can be expressed by the following general formula.

Formula 1

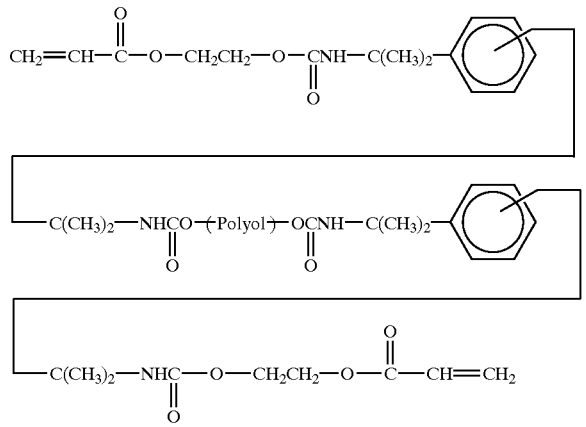

The two-part adhesive composition according to the present invention uses an acrylate having a hydroxyl group in its molecule as a reaction diluent besides urethane acrylate having the polytetramethylene glycol skeleton of the base resin. Suitable examples of such an acrylate are hydroxyethyl acrylate, 2-hydroxypropyl acrylate, 4-hydroxybutyl acrylate and 2-hydroxy-3-phenoxypropyl acrylate, and combinations thereof. More preferred acrylate are hydroxyethyl acrylate, 2-hydroxypropyl acrylate and 4-hydroxybutyl acrylate, and combinations thereof. These acrylates keep higher uniformity of the composition at the time of mixing during the preparation process of the two-part adhesive composition of the present invention than other esters, and viscosity adjustment of the composition can be conducted more easily.

The amount of urethane acrylate of the base resin in the two-part adhesive composition according to the present invention must be at least 40 wt % on the basis of the sum of the weights of urethane acrylate and the acrylate having a hydroxyl group as the reaction diluent. When the amount is less than 40 wt %, the optical disk obtained by bonding the disk substrates through the two-part adhesive composition fails to have sufficient durability. (For example, the composition cannot withstand a durability test at 80° C. and 90% R.H. for longer than 500 hours.) When the amount of urethane acrylate exceeds 80% of the sum of the weights of urethane acrylate and the acrylate having a hydroxyl group, the viscosity of the adhesive composition becomes so high that application becomes difficult, and the adhesion property to the metal film used in the optical disk drops undesirably.

In the two-part adhesive composition according to the present invention, the urethane acrylate of the base resin and the acrylate having a hydroxyl group of the reaction diluent are mixed, and the resulting base mixture is divided into first and second parts. Diacyl peroxide as an organic peroxide is added to the first part and a tertiary amine as a setting promoter is added to the second part.

The two-part adhesive composition according to the present invention is an adhesive composition that is set at a normal temperature by an oxidation-reduction reaction (the redox reaction). Diacyl peroxide as the organic peroxide in the present invention plays the role of an oxidant that enables the two-part adhesive of the present invention to set at a normal temperature (about 25° C.). The reason why the adhesive composition of the present invention is set at the normal temperature is because disk substrates in general are likely to undergo warp and deformation due to heat and setting at the normal temperature is employed to avoid this problem.

Concrete examples of diacyl peroxide as the organic peroxide that can be used appropriately in the present invention include benzoyl peroxide, m-toluoyl (benzoyl) peroxide, succinic peroxide, stearoyl peroxide, lauroyl peroxide and octanoyl peroxide, and combinations thereof. Preferred among them is benzoyl peroxide. Benzoyl peroxide has high solubility in the base resin, and benzoyl peroxide dissolved in the base resin has high preservation stability. Benzoyl peroxide can shorten the fixing time of the two-part adhesive composition of the present invention, and can provide corrosion-resistant optical disks.

Diacyl peroxide as the organic peroxide is dissolved in the first part obtained by dividing the mixture of urethane acrylate and the acrylate having a hydroxyl group (the base mixture) into two parts. The content of the organic peroxide in the first part is preferably 0.01 to 10 parts by weight on the basis of 100 parts by weight of the base mixture. When the content is less than 0.01 parts by weight, the reaction rate of the two-part adhesive composition becomes low. When the content exceeds 10 parts by weight, on the other hand, stability of the first part of the composition drops, and the composition is gelled in some cases. The preferred content of the organic peroxide is 0.1 to 2 parts by weight on the basis of 100 parts by weight of the base mixture.

The tertiary amine as the setting promoter is a compound playing the role of a reducing agent in the two-part adhesive composition according to the present invention that is set by the oxidation-reduction reaction. Ordinary amines having the function of promoting the setting reaction may be used, but the adhesive must be set at the normal temperature (about 25° C.) as described above. Concrete and preferred examples of the tertiary amine setting promoter in the present invention are N,N-dimethylaniline, N,N-diethylaniline, N,N-dimethyl-p-toluidine and N,N-diethyl-p-toluidine, and combinations thereof. More preferred setting promoters are aromatic tertiary amines, and even more preferred is N,N-dimethyl-p-toluidine.

The tertiary amine as the setting promoter is dissolved in the second part prepared by dividing the mixture of urethane acrylate and hydroxyl-containing acrylate into two parts. The content of the setting promoter in the second part is preferably 0.01 to 10 parts by weight on the basis of 100 parts by weight of the base mixture. When the content is less than 0.01 parts by weight, the reaction rate drops, and when it exceeds 10 parts by weight, large amounts of non-reacted components remain, often exerting adverse influences on durability of the disk.

A photo-polymerization initiator may be added to either one, or both, of the first and second parts of the two-part adhesive composition according to the present invention. The photo-polymerization initiator makes it possible to conduct photo-polymerization at the light-transmitting portions (the disk peripheral portion free from a signal recording layer and portions close to the center) of the disk fabricated by bonding the substrates together. It is also effective for speeding up setting of the adhesive composition and for keeping the thickness of the adhesive layer constant and flatness of the disk. Further, the photo-polymerization initiator makes bonding between the disk substrates stronger, and presumably contributes to prevention of degradation of the signal recording layer due to invasion of the moisture, for example. Ordinary photo-polymerization initiators can be used, and an example is Darocur 1173 of Ciba Specialty Chemicals Co.

When the photo-polymerization initiator is used, its blend amount is preferably 0.1 to 10 parts by weight on the basis of 100 parts by weight of the base mixture. When the blend amount is less than 0.1 parts by weight, sufficient photopolymerization cannot be expected, and when it exceeds 10 parts by weight, large amounts of non-reacted portions remain and possibly exert adverse influences on durability of the disk.

Various additives that are ordinarily used may be added to the two-part adhesive composition according to the present invention, whenever necessary. Examples of such additives include a thickener, a plasticizer, a dispersant, a polymerization inhibitor, a flame-retardant, a filler, a colorant, an anti-oxidant, a thermal age resistor, a UV absorber, a silane coupling agent, and so forth. Furthermore, an acrylate which does not have a hydroxy-group can be added, in addition to the acrylate with hydroxy group. These additives may be added to either one, or both, of the first and second parts of the two-part adhesive composition.

The two-part adhesive composition according to the present invention can be prepared by dividing a base mixture comprising a urethane acrylate of base resin and a hydroxyl containing acrylate of reaction diluent into two, and adding diacyl peroxide of organic peroxide to one of them and a tertiary amine of setting promoter to the other to provide first and second parts, respectively. Ordinary mixing means can be used to combine the first and second parts. When the photo-polymerization initiator and other additives are used in combination and the mixture is added to both first and second parts, they may be added to the base mixture when it is prepared from the base resin and the diluent. When they are added to only one of the first and second parts, they may be added to either one of these first and second parts.

When an optical disk is produced by bonding the disk substrates by the use of the two-part adhesive composition according to the present invention, the first and second parts are mixed to form a mixture, and the mixture is applied to either one, or both, of the disk substrates. The optical disk may be bonded by any known methods for bonding such disks. After the disk substrates are thus bonded, the composition is allowed to set. Alternatively, the first part is applied to one of the substrates and the second part, to the other, and the substrates are then bonded.

When the two-part adhesive composition, according to the present invention, is used for producing an optical disk by bonding the disk substrates, the composition sets within a short time whether the two disk substrates may be transparent or opaque, and provides an optical disk excellent in both durability under a high-temperature and high-humidity condition and in mechanical characteristics, as will be explained later in further detail. When both disk substrates have an information (signal) recording layer, bonding by means of the photocuring adhesive cannot be made and, therefore, the two-part adhesive composition according to the present invention is particularly effective.

Application of the adhesive composition to the optical disk can be suitably conducted by a spin-coat method. To spin-coat the adhesive composition, the composition is preferably prepared so that the viscosity of the coating solution is 500 to 10,000 mPa·s and more preferably about 1,000 to 5,000 mPa·s. When the aforementioned UV-6100B of the Nippon Synthetic Chemical Industry Co., Ltd. or an acrylate analogous to the former is used as urethane acrylate having the polytetramethylene glycol skeleton of the base resin, the viscosity of the suitable range described above can be easily obtained by using hydroxyethyl acrylate, 2-hydroxypropyl acrylate, 4-hydroxybutyl acrylate or their mixture as the acrylate having a hydroxyl group of the reaction diluent. The application method of the adhesive composition is not particularly limited to the spin-coat method, and other methods may be employed such as pattern coating, screen printing, curtain coating, roll coating, and spraying, as well.

The thickness of the adhesive layer formed and set by the adhesive composition may be within the range of 1 to 100 μm. As to DVD9, for example, the thickness of the adhesive layer is 55±15 μm.

Bonding of the disk substrates after the application of the adhesive composition is preferably made under vacuum de-foaming. This is because de-gassing can be made from the applied adhesive composition within a short time and bubbles can effectively be prevented from remaining between the substrates of the optical disk as the product. After bonding, the adhesive composition is allowed to set at the normal temperature, and the substrates are fixed to each other, providing the optical disk substrate.

The shorter the bonding time in the production of the optical disk by bonding the disk substrates, the shorter becomes the operation time of the whole optical disk production process. Therefore, it is preferred that after the two-part adhesive composition of the present invention is applied to the disk substrates, the substrates are then bonded to each other and the adhesive composition is allowed to quickly set to fix the disk substrates to each other. The fixing time of the disk substrates to each other can be expressed as the period of time during which the adhesive composition is applied to the disk substrates, the disk substrates are bonded to each other, the composition is set and the disk substrates do not relatively move. The two-part adhesive composition according to the present invention can accomplish the fixing time of about 2 to about 150 seconds.

The optical disk according to the present invention includes the disk substrates bonded to each other by using the two-part adhesive composition of the present invention and at least one reflecting metal film.

One of the optical disks according to the present invention is a read-only optical disk for reading signals on signal recording surfaces from both surfaces. As shown schematically in FIG. 1, the read-only optical disk 10 of the present invention includes in its simplest form two disk substrates 11 and 11' made of a transparent plastic material and reflecting metal films 12 and 12' of a metal such as aluminum that are formed on signal recording surfaces 11R and 11R' of the respective disk substrates. The disk substrates 11 and 11' are bonded to each other through an adhesive layer 13 made of the two-part adhesive composition according to the present invention in such a fashion that the reflecting metal films 12 and 12' are disposed inside the disk 10. Pits (not shown) are so formed on the signal recording surfaces 11R and 11R' of the disk substrates 11 and 11' as to correspond to recording digital signals. A data read operation is executed as the existence/absence of reflecting of laser beams (corresponding to the existence/absence of the pits on the signal recording surfaces 11R and 11R') irradiated from directions indicated by arrows A and A' in the drawing is detected.

More concretely, the first part of the two-part adhesive composition of the present invention is applied to the surface of the reflecting metal film 12 disposed on the disk substrate 11, for example. Similarly, the second part of the two-part adhesive composition of the present invention is applied to the reflecting metal film 12' disposed on the disk substrate 11'. The surfaces applied with the first and second parts are then bonded to each other, constituting the two-part adhesive composition of the present invention. After this composition is set, the adhesive layer 13 is formed, and the optical disk 10 shown in FIG. 1 can be obtained.

Figure 2:
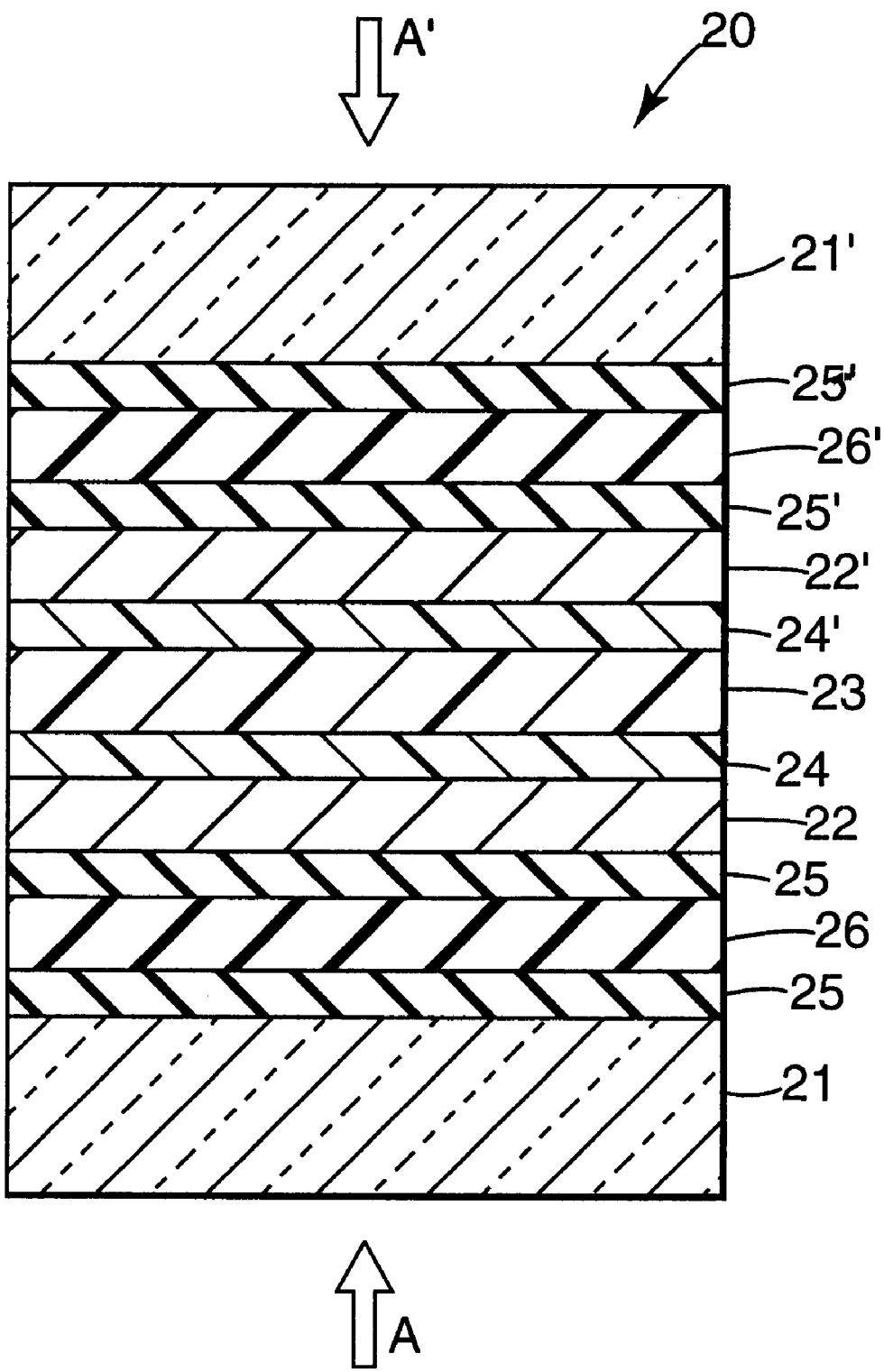
FIG. 2 is an explanatory view useful for explaining an optical disk according to another embodiment of the present invention.

Another optical disk according to the present invention is a rewritable optical disk capable of write/read and write/erase operations. As schematically shown in FIG. 2, a rewritable optical disk according to one embodiment of the present invention includes two disk substrates 21 and 21' made of a transparent plastic material, recording films 26 and 26' on one side of the respective disk substrates while sandwiched by dielectric layers 25 and 25' and reflecting metal films 22 and 22' of a metal such as aluminum formed on the dielectric layer of the laminate of the recording film and the dielectric layer. The disk substrates 21 and 21' are bonded to each other through an adhesive layer 23 formed from the two-part adhesive composition according to the present invention in such a fashion that the reflecting metal films 22 and 22' are disposed inside the disk 20. Acrylic type protective coating layers 24 and 24' may be formed between the reflecting metal films 22, 22' and the adhesive layer 23, respectively, for preventing degradation of the reflecting metal films, whenever necessary. The dielectric layers 25 and 25' are mainly made of a material such as ZnS—SiO$_2$, and the recording films 26 and 26' are mainly made of a compound of germanium, antimony and tellurium.

The rewritable optical disk 20 shown in FIG. 2 can be obtained by applying the first and second parts of the two-part adhesive composition of the present invention to the surfaces of the reflecting metal films 22 and 22' on the disk substrates 21 and 21' (to the surfaces of the protective coating layers 24 and 24', when used), and bonding the surfaces applied with the adhesive composition to each other to thereby give the adhesive layer 23, in the same way as the read-only optical disk explained with reference to FIG. 1.

Each recording film 26, 26' is also referred to as a "phase change film". This film is made of a material capable of reversibly changing the state between the crystalline state and the amorphous state by heat given by the data write/date erase beams irradiated from directions indicated by arrows A and A' in FIG. 2. The difference of the reflectances between the crystalline state and the amorphous state is detected photo-chemically, and are converted to digital signals of 0 (crystalline state) and 1 (amorphous state) for writing/erasing the data. To read the data written, the read laser beam is irradiated from the direction of the arrows A, A' in FIG. 2 to detect the difference in the reflectances corresponding to the written data.

As described above, the optical disk according to the present invention includes the read-only optical disk (that is generally called "DVD-ROM"), the write optical disk (that is generally called "DVD-R") and the rewritable optical disk (that is generally called "DVD-RAM" or "DVD-R/W").

In the optical disk according to the present invention, corrosion of the metal layer (particularly, the aluminum layer) is less then those compositions using conventional reducing agents when evaluated by a durability test under a high-temperature high-humidity condition of 80° C. and 90% R.H.

Moreover, unlike ordinary adhesive layers formed from compositions used for protective coating agents, the adhesive layer formed from the two-part adhesive composition according to the present invention exhibits high bonding strength to various materials used for the production of the optical disks, such as aluminum, gold, polycarbonates, and so forth, and has high impact absorbing capacity against impacts such as the drop of the optical disks. Therefore, the adhesive layer of this invention can provide optical disks that are hardly broken by impacts.

EXAMPLES

Next, the present invention will further be explained with reference to Examples thereof. Needless to say, however, the present invention is not limited to these Examples.

Example 1

First and second parts having an equal volume were prepared from a base mixture containing 60 wt % of polytetramethylene glycol type urethane acrylate, UV-6100B, a product of the Nippon Synthetic Chemical Industry Co., Ltd., as a base resin, and 40 wt % of 2-hydroxypropyl acrylate as a reaction diluent. Combinations of peroxides to be added to the first part and setting promoters (reducing agents) to be added to the second part were changed in various ways so as to examine solubility of the peroxides and the setting promoters into the base mixture, the fixing time of the adhesive composition and durability of the disk so bonded.

The peroxides used are listed below:
MEKPO: methyl ethyl ketone peroxide ("Permek N", product of NOF Corp.)
AAPO: acetylacetone peroxide ("Percure AH", product of NOF Corp.)
CHPO: cumen hydroperoxide ("Kayacumen H", product of Kayaku Akzo Co.)
BPO: benzoyl peroxide ("Nyper BW", product of NOF Corp.)

The setting promoters (reducing agents) used are listed below:

NpCo: cobalt naphthenate (product of Wako Pure Chemical Industries, Ltd.)

VN-2: vanadium type catalyst (accelerator, product of Kayaku Akzo Co.)

NpCu: copper naphthenate (product of Wako Pure Chemical Industries, Ltd.)

ETU: 1,3-diethylthiourea (product of Wako Pure Chemical Industries, Ltd.)

NNDMpT: N,N-dimethyl-p-toluidine (product of Wako Pure Chemical Industries, Ltd.)

The peroxide and the setting promoter, listed in the columns of "peroxide" and "setting promoter" in Table 1, were used in the respective amounts also listed in the columns. Each amount was expressed in terms of "parts by weight" on the basis of 100 parts by weight of the base mixture.

Table 1 tabulates also solubility of the organic peroxides and the setting promoters in the base mixture, the fixing time of the adhesive compositions, and durability of the bonded disks (refer to "solubility", "fixing time", and "durability", respectively).

Solubility was evaluated as "good" when a predetermined amount of a peroxide or setting promoter was uniformly dissolved in the base mixture when it is mixed with the latter at room temperature, and as "poor" when they separated.

The fixing time was measured by separately applying a drop of each of the first and second parts to a slide glass, bonding them together and measuring the time till they did not move.

Durability was evaluated in the following way. The first and second parts were spin-coated to a DVD-9 type disk substrate having gold and aluminum recording layers (expressed as "Au/Al" in Table 1) and to a double-side DVD-RAM type disk substrate (expressed as "RAM/RAM" in Table 1, having a protective coat on the recording layer), and both disks were bonded by using a Sumitomo 3M Ltd. DLB-9900 bonding machine under vacuum and at ambient temperature. Each disk so bonded was left standing for more than one day in a room temperature atmosphere, and was then subjected to a durability test at 80° C. and 90% R.H. The disk was checked 500 hours later and 1,000 hours later to examine corrosion of the recording layer. Symbol X represents the recording layers having vigorous corrosion, Δ represents the recording layers having a certain degree of corrosion and O represents the recording layers hardly having, or not at all having, corrosion.

TABLE 1

| | Peroxide (first part) | Solubility | Setting Promoter (second part) | Solubility | Fixing Time | Disk | Durability 500 hrs. | 1,000 hrs. |
|---|---|---|---|---|---|---|---|---|
| Comp. Example | MEKPO 1 part | Good | NpCo 2.5 parts | Poor | Not set | — | — | — |
| | AAPO 1 part | " | NpCo 2.5 parts | " | " | — | — | — |
| | CHPO 4 parts | " | NpCo 2.5 parts | " | " | — | — | — |
| | CHPO 4 parts | " | VN-2 1 part | Good | 2.5 min. | Au/Al RAM/RAM | × O | × Δ |
| | CHPO 4 parts | " | ETU 1 part | " | 19 min. | — | — | — |
| | CHPO 4 parts | " | ETU 1 part NpCu 0.1 part | " | 1 min. | Au/Al | × | — |
| | CHPO 4 parts | " | ETU 1 part VN-2 0.3 part | " | 2 min. | Au/Al RAM/RAM | × Δ | — Δ |
| Example | BPO 2 parts | " | NNDMpT 1 part | " | 30 sec. | Au/Al RAM/RAM | O O | O O |

It was found from the result listed above that when benzoyl peroxide and N,N-dimethyl-p-toluidine were used as the peroxide and the setting promoter (reducing agent), respectively, they had high solubility and a high reaction rate, and provided excellent durability of the bonded disks under a high-temperature high-humidity condition.

Example 2

The following two-part adhesive compositions were prepared by using cleavage type 2-hydroxy-2-methyl-1-phenylpropane-1-on ("Darocur 1173", product of Ciba Specialty Chemicals Co.) and hydrogen abstraction type [4-(methylphenylthio)phenyl)phenylmethanone ("KAYACURE BMS", product of Nippon Kayaku K. K.) as the photo-polymerization initiators.

(1) System Containing Darocure 1173:

First Part:

A composition containing UV-6100B, 2-hydroxypropyl acrylate, BPO (benzoyl peroxide) and Darocur 1173 at a weight ratio of 60/40/1/2.

Second Part:

A composition containing UV-6100B, 2-hydroxypropyl acrylate, NNDMpT (N,N-dimethyl-p-toluidine) and Darocur 1173 at a weight ratio of 60/40/1/2.

(2) System Containing KAYACURE BMS:

First Part:

A composition containing UV-6100B, 2-hydroxypropyl acrylate, BPO and KAYACURE BMS at a weight ratio of 60/40/1/2.

Second Part:

A composition containing UV-6100B, 2-hydroxypropyl acrylate, NNDMpT and KAYACURE BMS at a weight ratio of 60/40/1/2.

Bonding of the double-side DVD-RAM type substrates and bonding of the DVD-9 type substrates were carried out by using the systems (1) and (2) in the same way as in Example 1, respectively. After bonding, UV irradiation at 25 mW/cm$^2$ (approximately 360 nm) was conducted (for about 4 seconds). The disk edge, too, could be set within a short time without tackiness. A durability test was conducted in the same way as in Example 1 but no change of appearance could be observed after the passage of 1,000 hours.

The present invention can produce an optical disk within a relatively short time by bonding together disk substrates. The present invention can provide an optical disk, a metal film, particularly an aluminum film, of which is not corroded in a durability test under a high-temperature high-humidity condition of as high as 80° C. and 90% R. H. for 1,000 hours. The two-part adhesive composition according to the present invention is particularly suitable for bonding optical disks such as DVD having signal (information) recording layers on both sides. Moreover, the present invention can also be applied to magneto-optical disks (MO), and so forth.

What is claimed is:

1. A two-part adhesive composition comprising first and second parts each part containing urethane acrylate having a polytetramethylene glycol skeleton, and an acrylate having a hydroxyl group in its molecule, wherein said first part further contains a diacyl peroxide and said second part further contains a tertiary amine, the amount of said urethane acrylate is 40 to 80 weight percent of the sum of the weights of said urethane acrylate and said acrylate having a hydroxyl group, the two-part adhesive composition having a fixing time of about 2 to about 150 seconds.

2. A two-part adhesive composition according to claim 1, wherein said urethane acrylate having a polytetramethylene glycol skeleton is an oligomer comprising at least portions originating from tetramethylxylene diisocyanate, hydroxyethyl acrylate and ethylene glycol.

3. A two-part adhesive composition according to claim 2, wherein said oligomer is an oligomer obtained from polytetramethylene glycol, tetramethylxylene diisocyanate, hydroxyethyl acrylate and ethylene glycol in a molar ratio of about 62:15:14:9, and having a weight average molecular weight of about 4,000 to about 7,000.

4. A two-part adhesive composition according to claim 1, wherein said acrylate having a hydroxyl group is at least one member selected from the group consisting of hydroxyethyl acrylate, 2-hydroxypropyl acrylate, 4-hydroxybutyl acrylate and 2-hydroxy-3-phenoxypropyl acrylate.

5. A two-part adhesive composition according to claim 1, wherein said diacyl peroxide is a member selected from the group consisting of benzoyl peroxide, m-toluoyl(benzoyl) peroxide, succinic peroxide, stearoyl peroxide, lauroyl peroxide and octanoyl peroxide.

6. A two-part adhesive composition according to claim 1, wherein said tertiary amine is a member selected from the group consisting of N,N-dimethylaniline, N,N-diethylaniline, N,N-dimethyl-p-toluidine and N,N-diethyl-p-toluidine.

7. A two-part adhesive composition according to claim 1, wherein either one, or both, of said first and second parts further contain a photo-polymerization initiator.

8. A two-part adhesive composition according to claim 1, wherein the amount of said organic peroxide is 0.01 to 10 parts by weight on the basis of 100 parts by weight of the sum of said urethane acrylate and said acrylate having a hydroxyl group contained in the first and second parts.

9. A two-part adhesive composition according to claim 1, wherein the amount of said organic peroxide is 0.1 to 2 parts by weight on the basis of 100 parts by weight of the sum of said urethane acrylate and said acrylate having a hydroxyl group contained in the first and second parts.

10. A two-part adhesive composition according to claim 1, wherein the amount of said tertiary amine is 0.01 to 10 parts by weight on the basis of 100 parts by weight of said urethane acrylate and said acrylate having a hydroxyl group contained in the first and second parts.

11. An optical disk including disk substrates bonded to each other and at least one reflecting metal film, characterized in that, said disk substrates are bonded to each other by using said two-part adhesive composition according to claim 1.

12. A method of producing an optical disk comprising the steps of:

mixing said first and second parts of said two-part adhesive composition according to claim 1;

applying the mixture to either one, or both, of said disk substrates; and bonding said disk substrates.

13. A method of producing an optical disk according to claim 12, wherein either one, or both, of said first and second parts further contain a photo-polymerization initiator.

14. A method of producing an optical disk comprising the steps of:

applying said first part of said two-part adhesive composition according to claim 1 to either one of disk substrates;

applying said second part to the other of said disks; and bonding said disk substrates.

15. A method of producing an optical disk according to claim 14, wherein either one, or both, of said first and second parts further contain a photo-polymerization initiator.

* * * * *